United States Patent [19]

Pearson

[11] Patent Number: 4,508,220
[45] Date of Patent: Apr. 2, 1985

[54] U-CLIP ASSEMBLY AND METHOD OF PRODUCING AND UTILIZING THE SAME

[75] Inventor: Kenneth C. Pearson, Glenview, Ill.

[73] Assignee: Hartco Company, Skokie, Ill.

[21] Appl. No.: 586,669

[22] Filed: Mar. 6, 1984

Related U.S. Application Data

[63] Continuation-in-part of Ser. No. 366,790, Apr. 9, 1982.

[51] Int. Cl.³ .................................. B65D 71/00
[52] U.S. Cl. ........................... 206/343; 24/20 W; 206/338; 206/390
[58] Field of Search ............. 24/20 CW, 20 W, 23 W, 24/259 R; 206/338–347, 390, 820

[56] References Cited

U.S. PATENT DOCUMENTS

| | | | |
|---|---|---|---|
| 3,083,369 | 4/1963 | Peterson | 206/346 |
| 3,613,878 | 10/1971 | Langas et al. | 206/340 |
| 3,722,670 | 3/1973 | Plunkett | 206/340 |
| 3,758,703 | 9/1973 | Golden | 206/340 |
| 3,891,087 | 6/1975 | Maynard | 206/346 |

FOREIGN PATENT DOCUMENTS

| | | | |
|---|---|---|---|
| 1478829 | 2/1969 | Fed. Rep. of Germany | 206/346 |
| 2250375 | 7/1973 | Fed. Rep. of Germany | 206/345 |

Primary Examiner—George E. Lowrance
Assistant Examiner—Jimmy G. Foster
Attorney, Agent, or Firm—Wallenstein, Wagner, Hattis, Strampel & Aubel

[57] ABSTRACT

An improved clip assembly in the form of a row of aligned U-shaped clips. The clips are maintained in aligned relation to each other by resilient interconnecting means such as small diameter flexible strong metal wires which advantageously are intimately secured to the crown portions of the clips by a metal-to-metal bond. The assembly can be wound, in the manner of spool of thread or wire, into a tight, self-sustaining, compact roll comprising thousands of clips. The invention also involves a method of producing said improved clip assembly and a method in which said improved clip assembly is utilized to wrap the U-shaped clips on overlying wire members to produce bed spring, furniture and the like.

5 Claims, 8 Drawing Figures

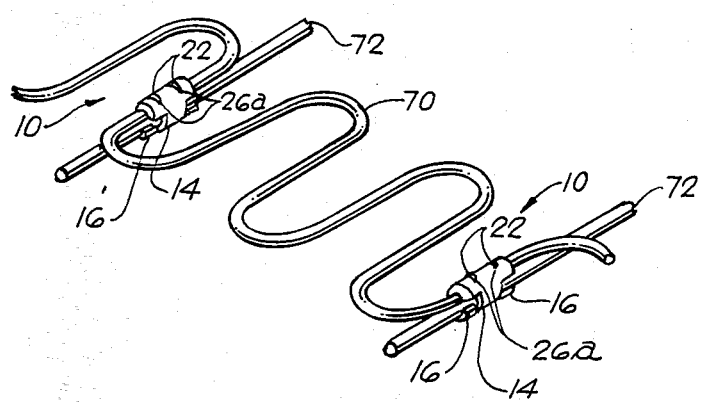
FIG. 1
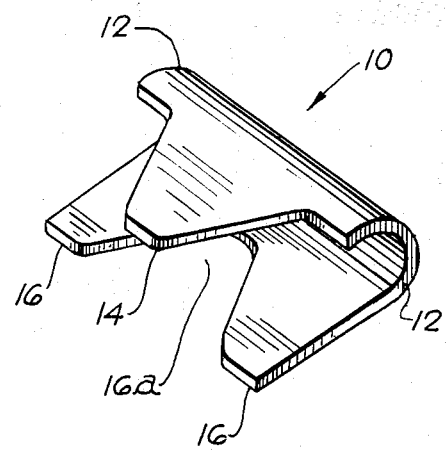
FIG. 2
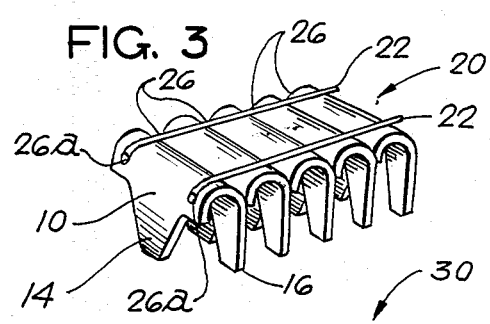
FIG. 3
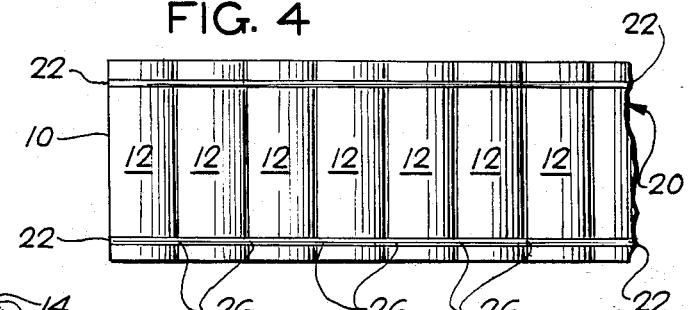
FIG. 4
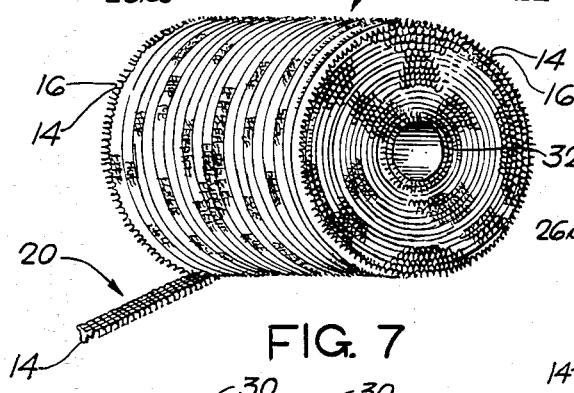
FIG. 5
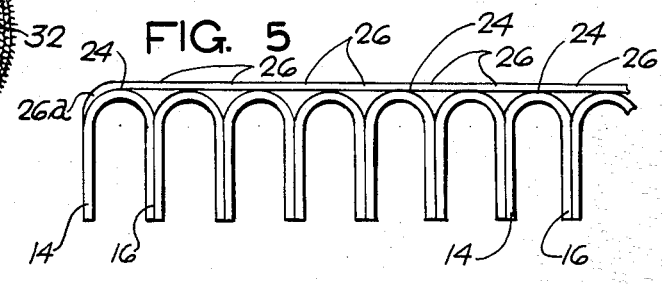
FIG. 6
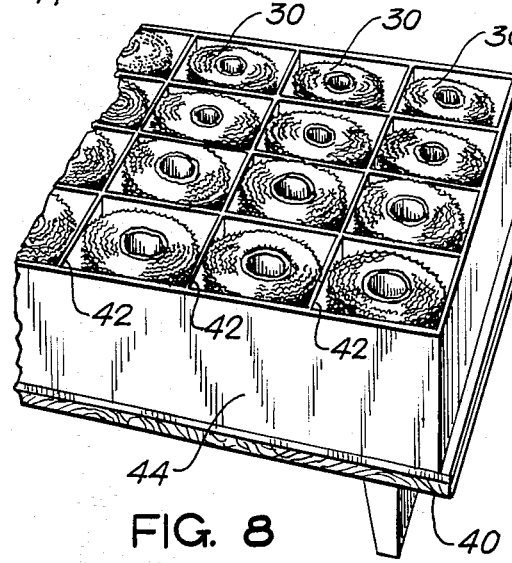
FIG. 7 / FIG. 8

U-CLIP ASSEMBLY AND METHOD OF PRODUCING AND UTILIZING THE SAME

This application is a continuation-in-part application of U.S. patent application Ser. No. 06/366,790, filed Apr. 9, 1982.

TECHNICAL FIELD

The present invention, in one of its aspects, relates to an improved clip assembly comprising a plurality of generally U-shaped clips which are maintained in positive, fixed, abutting, or near abutting, aligned relation to one another by metal carrier means, in particular, a pair of spaced, longitudinally extending, flexible wire members. The metal carrier means enables the clip assembly both to be oscillatingly wound, under tension, upon a cylindrical core member to provide an integrated, tightly wound, spool-like roll comprising at least several thousand interconnected clips, and to be unwound from the roll by a pulling force exerted on the free end of the clip assembly, without in any way altering or disrupting the positive, fixed, aligned relation of the clips with respect to one another. The clip assembly is adapted for use with a clinching machine capable of exerting such a pulling force on the leading or free end of the clip assembly to cause the assembly to unwind from the roll, while at the same time being capable, at high speed, of sequentially severing and wrapping the clips on elements of a workpiece, especially overlapping wire members employed in the manufacture of furniture, bed springs, and the like, to secure the wire members together. The invention also involves a method which comprises sequentially severing and wrapping a clip on overlying wire members employed in the manufacture of furniture, bed springs, and the like in which the improved clip assembly of the present invention is utilized.

BACKGROUND OF THE PRIOR ART

In U.S. Pat. No. 3,613,878, there is disclosed a clip assembly in the form of a row of U-shaped sheet metal clips. The clips are maintained in alignment with each other either by means of a pliant carrier strip which may be a plastic tape, most suitably a polyester plastic tape, the width of which is slightly less than the width of the clips, which is adhered to, or wrapped on essentially the entire outer surface of the arcuate crown portion of each clip by means of an adhesive, such as a pressure sensitive adhesive, or by means of a continuous layer of an adhesive substance per se. The clip assembly of the patent is adapted to be used with a hand-held clinching tool provided with a magazine for receiving the clip assembly, and along which the clip assembly is pushed rather than pulled in the direction of the forming jaw of the tool by a slidable member in abutting engagement with the last clip of the assembly. While the patent states that an "indeterminate" or "indefinite" number of the pliant material adhesively held U-clips can be spiraled into a coil, and that such a coil "could be extensive enough to keep an automatic clip-reforming machine operating for an entire workday", in actual practice those statements proved to be merely prophetic and, in actual commercial usage in the field, the attainment of those goals was found in no way to be attainable. More specifically in this connection, with the introduction of high-speed clinching machines, whether they be of the stationary type, or robot-like in operation, wherein each clip of the clip assembly is subjected to a substantial pulling force whereby each clip is successively pull-feed, at a rapid rate, into the forming jaw of the clinching machine, the clip assembly made directly in accordance with the preferred embodiment shown in said patent could not withstand the pulling or tension forces applied to it by such machines with the result that the adhesively held tape would be pulled free of, or be disengaged from, a major surface area of the arcuate crown portion of the clips causing the clips to be dislodged from the clip assembly and the integrity of the coil formed from the assembly to be disrupted to a point where it was of no practical use with such a pull-feed mechanism. As a consequence, the clip assembly made in accordance with the patent was later found, in commercial operations, to be limited to use with a push-feed mechanism and, as a result, could only be used in lengths of up to about 45 clips. An operator, therefore, was compelled to reload as many as five times in order to complete a single mattress innerspring, for example. Moreover, it was found that the clip assembly of the patent could not be wound into a tight, integrated roll, in the manner of a spool of thread or wire, because the tension placed on the clips during winding would cause the tape or adhesive to be pulled away from, or peel off the crown portions of the clips, and the clips would fall off. Also, due to the highly flexible, non-rigid character of the tape, the clip would tend to unravel and fall away from the roll, thereby creating shipping and handling problems which made the use of the clip assembly in roll form impractical and uneconomical.

U.S. Pat. No. 3,722,670 discloses a clip assembly which utilizes elongated strands of a small diameter plastic filament, or a soft wire, which are inserted into performed open-end recesses or notches provided in the lateral margins or edges on both sides of each clip of the assembly. The filament or wire is held in the notches by frictional forces only. Any pulling force, or tension, placed on the assembly, therefore, would act to misalign the clips, or even separate them from the assembly. A further serious shortcoming of such a clip arrangement is the tendency of the portions of the clip retaining wires between the legs of adjacent clips, when a clip is severed, to become lodged or wedged between the inner wall of the crown of the clip and the wrapped wire members of an innerspring mattress spring, for example. In the event that these severed pieces of wire become dislodged, a loose clip results permitting movement of the wrapped wire members of the mattress spring in relation to one another, resulting in a squeaky innerspring mattress. A further problem with the arrangement of said patent is that the notches formed in the legs of the clip tend to weaken the clip resulting in improper wrapping of the clips on the wire members of a workpiece. A still further failing of an arrangement such as that shown in U.S. Pat. No. 3,722,670 is that the severed wire on each side of the legs of a clip presents sharp, abrasive edges which are a source of injury to workers, and which cut and tear the fabric placed over an innerspring mattress.

German Pat. No. 1478829 is directed to a nailing strip for use in a power driven nailing machine. As such it is irrelevant, unrelated and foreign to the clip assemblies of the present invention in concept, approach, function, structure, and objectives. More specifically, in said German patent the nails comprising the strip are secured together by either a single strand of wire which extends across the tops of the flat-headed nails, or by two strands of wire which, according to the patent, may be secured on the upper surface of the flat-headed nails, the undersurface thereof, or, as a third alternative, on the upper ends of the shanks of the nails. Apparently any one of the various positions of the wire strands is as good as any of the others illustrated in the patent. The nails comprising the strip are intended to be driven into a workpiece such as roofing shingles, or the like, by means of a nailing machine. Wholly apart from their total lack of utility for wrapping wire members of the type employed in the manufacture of furniture, bed springs, and the like, the nailing strips shown in the German patent could not be used with the high-speed clip-clinching machines utilized in the manufacture of such articles. More specifically in this connection, the nail shanks of the nailing strips of the German patent can move transversely with relation to the longitudinal axis of the nailing strip as the nails are being successively advanced in the direction of the nail severing mechanism. As a result, misalignment of the nails can take place causing improper, or no, penetration of the nail into a workpiece. Such lateral movement in a clip-clinching machine would be intolerable in that the clip would be misaligned and no wrapping of the clip could occur, and, in all likelihood, the machine would jam. Also, severing of the nails of the strip of the German patent would leave sharp edges which would cause cutting or tearing of the fabric used in upholstering furniture and finishing innerspring mattresses. A further important disadvantage of an arrangement such as that disclosed in German Pat. No. 1478829 is that the strips cannot be wound upon themselves in roll form, in the manner of a spool of thread or wire, to form a compact, integrated, self-sustaining roll comprising thousands of nails.

U.S. Pat. No. 3,083,369 discloses a nailing strip in which the nails are held together by means of wires secured to the sides of the shanks of the nails. The nails, as in the case of German Pat. No. 1478829, are intended to be driven into a workpiece by a nailing machine, and do not have any utility whatever for wrapping wire members of the type used in making furniture and mattress springs. Also, as in the case of said German patent, the severed wires present sharp edges, and the nails are neither intended, nor are they adapted to be wound, in spool-like form, into a roll. In short, like the aforesaid German patent, U.S. Pat. No. 3,083,369 is irrelevant, unrelated and foreign to the clip assemblies of the present invention in concept, approach, function, structure and objectives.

In U.S. Pat. No. 3,758,703 there is shown channel-shaped electrical connectors for splicing insulated wires. The connectors are disposed along a carrier or tape, and are adapted to be fed into a special crimping device. Prong clusters are carried on an insert carried by the connectors for piercing the insulation on electrical conductors.

U.S. Pat. No. 3,891,087 discloses a nail package which is an improvement of the nailing strip shown in U.S. Pat. No. 3,083,369. The package of Pat. No. 3,891,087 employs connecting elements for interconnecting the trailing nail of one package with the leading nail of a new nail package as the nail packages are fed into a nail driving machine.

German Pat. No. 2,250,375 shows a nail strip which also is similar to the nailing strip of U.S. Pat. No. 3,083,369. Each nail of the strip is provided with spaced transverse notches in its shank for receiving wires which act to hold the nails comprising the strip together. The strip is adapted for use in a nailing machine which drives a nail into a workpiece, the head of each driven nail acting to sever the wires held in the notches formed in the shanks of each nail.

As will be apparent from the following detailed description of the present invention, the disclosures of the foregoing three last-mentioned patents, and as was stated above in regard to the earlier German Pat. No. 1,478,829, are irrelevant, unrelated and foreign to the clip assemblies of the present invention in concept, approach, function, structure and objectives, and involve an entirely different commercial environment from that of the present invention.

BRIEF SUMMARY OF THE INVENTION

In accordance with present invention, an improved clip assembly has been evolved which is uniquely adapted for use in automatic clinching machines of the type employed in high-speed production line operations. The invention also is directed to a method for producing and utilizing said clip assembly for sequentially severing and wrapping a clip on overlying wire members employed in the manufacture of furniture, bed springs, and the like. The integrated, high-strength structural features of the assembly, together with its excellent resistance to any pulling or tensional forces tending to disrupt the integrity of the assembly, coupled with an optimum degree of flexibility, enable the assembly to be formed, in the manner of a spool of thread or wire, into a compact, tightly wound easily handled, self-sustaining cylindrically shaped roll comprising at least several thousand U-shaped clips, indeed, as many as about 12,500 or more of such clips. The tightly wound roll, when mounted for rotation on a rod or bar, for example, can be pull-fed at a high rate of speed into the forming jaw of an automatic clip-clinching machine without any failure of the clip assembly or the tightly wound roll. Use of the assembly in the form of a roll comprising thousands of interconnected U-shaped clips reduces down times to a minimum thereby enhancing significantly the efficiency and the economic advantages of the overall automated operation. Thus, by way of illustration, in the manufacture of an innerspring mattress, approximately 180 to approximately 250 clips are required to be wrapped on the wire members forming each mattress innerspring. Utilizing a tape-held clip assembly of the type disclosed in U.S. Pat. No. 3,613,878, such an assembly can only actually be used in lengths of up to about 45 clips in commercial operations. As a result, an operator of a clip wrapping tool, capable of applying 120 clips a minute, is compelled to reload clips into the tool at least about four or five times in order to complete a single mattress innerspring. Stated differently, an operator using the assembly of said U.S. Patent, where five reloads of clips are necessary to complete a mattress innerspring, is required to stop about 2.66 times each minute to reload the clip wrapping tool. In the case of a skilled operator, each reloading takes approximately 10 seconds. Out of each minute, therefore, approximately 26.6 seconds are lost in reloading the tool. In marked contrast to the situation with the pliant material adhered carrier strip or tape-held clips of U.S. Pat. No. 3,613,878, the novel and improved clip assembly of the present invention makes feasible, as stated, the use of said clip assembly in the form of a roll comprising of the order of about 12,500 clips, or 277.7 times the number of clips on a 45 clip strip of the type disclosed in said U.S. Pat. No. 3,613,878. As a result, 277.7 fewer reloadings of a clip wrapping tool are required, or, in terms of time, a savings of 2777 seconds, or 46.3 minutes per roll.

The improved clip assembly of this invention, in brief, comprises a plurality of generally U-shaped clips having a crown or head portion and depending leg portions integrally joined to the transverse margins of the crown or head portion. It should be mentioned here that the construction of the individual U-shaped clips employed in the fabrication of the improved clip assembly of the present invention are structually essentially the same as the clips comprising the clip assembly described in U.S. Pat. No. 3,613,878, and it should be understood, therefore, that the various embodiments of the clip, per se, illustrated and described therein are incorporated by reference in the present disclosure. The clips comprising the assembly of this invention, like the clips of the assembly shown in the aforementioned patent, are in the form of a row. The clips of the improved assembly, however, are maintained in positive, fixed abutting, or near abutting, aligned relation to one another by resilient, interconnecting, metal carrier means advantageously intimately bonded in point contact to each of the clips comprising the assembly. In a preferred embodiment of the clip assembly of this invention, the interconnecting means comprises a pair of small diameter, flexible, low-carbon steel wires which are positioned in positive, fixed spaced relation to one another in point, substantially tangential contact with the outer surface of the crown or head portion of each of the clips comprising the assembly, and are intimately bonded, as by spot welding to form a metal-to-metal bond with the crown or head portion of each of the clips. The wires thusly secured to the clips establish the positive, fixed spaced relationship of clips with respect to each other, and provide severable, clip spanning portions which freely extend between each bonded contact point along the length of the clip assembly thereby enabling the clips to be pull-fed into a clinching tool and to be sequentially severed and wrapped by the tool on overlapping wire members of the type used in the manufacture of furniture, for example, without in any way disrupting the fixed, spaced relationship of the clips comprising the assembly. The clip spanning portions of the interconnecting means also serve to impart a flexibility to the clip assembly which enables the assembly to be oscillatingly wound, in the manner of a spool of thread or wire, under tension into a tight, compact, cylindrically shaped, self-sustaining roll of desired dimensions without in any way disrupting either the fixed, spaced relationship of the clips to one another throughout the assembly, or the structural integrity of the clip assembly.

The superior structural strength of the clip assembly of this invention permits each clip of the assembly to be sequentially drawn or pulled, under substantial tension, from a roll of the clips by a high-speed clinching tool into a position where the reciprocatable plunger and the forming jaw of the tool can wrap the clips on wire members used in the construction of furniture, bed springs, and the like. Furthermore, the integral, high strength, all metal construction of the clip assembly per se, and the integral, self-sustaining character of a tightly wound roll formed from the assembly, act to resist any forces encountered during handling or use which may have an adverse affect on the structural integrity of the assembly and/or the roll formed from it. The assembly in roll form can be stored for prolonged periods under substantially any normally encountered temperature and humidity conditions without deterioration.

The foregoing, and other features and advantages of the improved clip assembly of the present invention will become more apparent from the description to follow, taken in conjunction with the accompanying drawings wherein:

BRIEF DESCRIPTION OF THE DRAWINGS

FIG. 1 is a view in perspective of the wire members of a zig-zag spring secured to bordering retaining wires by a clip comprising an embodiment of the clip assembly of the present invention;

FIG. 2 is an enlarged view in perspective of said embodiment of the clip used for the purpose illustrated in FIG. 1;

FIG. 3 is a view in perspective of a portion of an embodiment of the clip assembly of the present invention;

FIG. 4 is an enlarged top plan view of the embodiment of the assembly shown in FIG. 3;

FIG. 5 is a side view in elevation of said embodiment as illustrated in FIG. 4;

FIG. 6 is an enlarged diagrammatic view, partly in section, showing an embodiment of the clip assembly positioned in the magazine of a clinching tool, and a clip of the assembly being severed by the reciprocatable plunger of the tool prior to being secured on wire members held in the forming jaw of the tool;

FIG. 7 is a somewhat schematic view in perspective showing the clip assembly in the form of a compact, self-sustaining roll comprising several thousand clips; and FIG. 8 is a somewhat schematic, partial view in perspective showing a carton in which several rolls of the clips are packaged ready for shipment, storage or use.

DETAILED DESCRIPTION OF THE INVENTION

As stated hereinabove, the U-shaped clips comprising the clip assembly of this invention, and a method for its production, and which clip assembly is used in the practice of the method for sequentially severing and wrapping a clip on overlying wire members employed in the manufacture of furniture, bed springs, and the like, may be of several different forms as illustrated and described in U.S. Pat. No. 3,613,878. In FIG. 2 of the present drawings, one form of such a clip is shown. The clip, designated generally by reference numeral 10, desirably comprises a one-piece unit having an arcuate or rounded crown or head portion 12 to the transverse margins of which are joined depending leg portions 14 and 16. The leg portion 14, as shown, is generally triangular in shape and is positioned substantially intermediate the ends of the crown or head portion 12. The leg portion 16 is provided with a centrally located recess 16a which substantially corresponds in shape and dimensions to the leg portion 14. When the clip 10 is wrapped by a clinching tool on overlapping wires, as illustrated in FIG. 1, the leg portions 14 and 16 are reformed or deformed in a manner to position the leg portion 14 in the recess 16a of the leg portion 16 thereby providing an integrated structure with no exposed sharp or fraying edges.

Referring, now, to FIGS. 3, 4 and 5 of the drawings, the embodiment of the clip assembly there illustrated, and designated generally by reference numeral 20, comprises a predetermined number of clips, such as the clip 10, only a very few of which clips are by necessity, shown, arranged in aligned side-by-side relation to one another. The clips, when arranged in the form of a straight row as shown in FIGS. 3, 4 and 5, have the leg portion 14 thereof contiguous to the leg portion 16 of the next clip in line, and the assembly, when pull-fed into a clinching tool, will be oriented with respect to the forming jaw of the tool to position the leg portion 14 of the clips, as illustrated in FIG. 3, in the direction of the forming jaw.

The clips 10 forming the clip assembly 20 are maintained in alignment with one another by metal carrier means, which, in the embodiment of the invention illustrated, comprise a pair of longitudinally extending, small diameter, flexible, metal wires 22—22 which are positioned in spaced apart relation, inwardly of the side margins of the crown or head portion 12 of the clips. The wires employed for this purpose desirably are made of a low carbon steel, as noted above, and can range in diameter from about 0.015 to about 0.030 inch, more or less. Wires of other metal, which possess flexibility and high strength, generally comparable to that of low-carbon steel, can be used but, in general, steel wires are most desirable from an economic as well as other standpoints. The wires 22—22, as best shown in FIG. 5, are in substantially tangential, positive, fixed point contact with the outer surface of the crest of the crown or head portion of each of the clips, and are intimately, and preferably, permanently, bonded to the crown or head portion of each clip of the assembly 20 at their point of contact therewith. The bond 24 (see FIG. 5) between the wires 22—22 and the crown or head portion of the clips advantageously is a metal-to-metal bond formed by fusing, as by spot welding, the wires to the crowns or head portions. To this end, the wires 22—22 desirably are copper-coated to enhance their electrical conductivity, but this is not in any way essential to the present invention. While spot welding is the preferred means for securing the wires on the clips, soldering or brazing, for example, may also be used to attain an intimate bond therebetween. The carrier means also can be in the form of a flat metal strip, or strips, secured to the crown portion of the clips in the same manner as the small diameter wires.

It may also here be observed that whereas, in the clip assembly of the aforementioned U.S. Pat. No. 3,613,878, the width of the pliant carrier strip adhered adhesively to the clips in the clip assembly, whether through the use of plastic tapes or adhesives per se, is slightly less than the width of the clips of the clip assembly, in sharp contrast thereto, in the clips of the clip assembly of the present invention, the diameter of the flexible, metal wires 22—22 represents, in relationship to the overall width of the individual clips in the clip assembly, measured along the arcuate crown portion, only a very minor fraction thereof.

Again, as best shown in FIG. 5, bonding of the wires 22—22 to the crown or head portion 12 of the clips 10 at their point of contact therewith, provides freely extending, severable, clip spanning portions 26 between each of the longitudinally aligned bonds formed on the crown or head portions of the clips. The clip spanning portions 26 enable the clips of the assembly to be sequentially severed by the plunger of a clinching tool, and, equally importantly, have a length and flexibility such that the assembly can be formed into a tightly wound, compact, self-sustaining roll without disrupting the structural integrity of the assembly.

Referring, now, in particular to FIGS. 7 and 8 of the drawings, the novel and improved clip assembly of the present invention makes possible the formation thereof of tightly wound, compact, self-sustaining rolls, as shown in said figures. The roll, designated generally by reference numeral 30, desirably includes a supporting, cylindrically shaped core member 32 upon which the clip assembly 20 can be wound, under tension, by oscillating the assembly, in the manner of line being guided on a fishing reel during retrieval, from one end of the member 32 to the other until a desired number of convolutions of the clip assembly has been formed to provide a cylindrically shaped roll comprising anywhere, depending upon the size of the clips making up the assembly, desirably from about 4500 to about 12,500 clips. The core member 32, where used, may be formed of paperboard, plastic, wood or lightweight metal. While the dimensions of the core member 32 can be varied to meet the requirements of substantially any furniture or bed spring manufacturing operation, generally, the core member 32 will have a length of about 10 to about 15 inches, usually about 11 to about 12 inches, and a diameter which can range from about 2 to about 4, preferably about 3 to 3.5 inches. The roll 30 generally will have a length corresponding to the length of the core member 32, and will have a diameter of about 9 to about 15 inches, desirably about 10 or 11 to about 12 inches. A roll having the foregoing dimensions not only is compact and easy to handle, but, also, is self-sustaining and capable, during shipment and use, of withstanding rough handling without any adverse affect on the integrity of the roll. The ability of a roll formed from the U-clip assembly of this invention to be self-sustaining and to retain its integrity even under the roughest treatment, is due, in part, to the fact that the assembly is tightly wound with the leg portions 14 and 16 of each clip facing radially outwardly so that the crown or head portion 12 of each clip on each successive oscillation is brought into contact with the leg portions 14 and 16 of the next preceding convolution of the clip assembly comprising the roll. In this way, the wire members 22—22 secured on the crowns of the clips engage the ends of the leg portions 14 and 16 of the clips which they overlie and are in contact with, thereby acting to impede or prevent any lateral movement of the convolutions of the assembly with relation to adjacent convolutions of the assembly and thus eliminating any tendency of the assembly to unravel from the roll. The unique self-sustaining properties of a roll formed with the clip assembly is evident from the fact that no ridges or end caps are required on the ends of the core member 32 to protect against unraveling of the clip assembly from the roll.

In FIG. 8 of the drawings there is illustrated a manner in which rolls, such as the roll 30, formed from the clip assembly can be packaged for shipment, or stored for future use. The number of rolls in a carton may vary. In the embodiment shown in FIG. 8, sixteen rolls 30 are positioned upright on one end, in rows, on a sheet of cardboard, or the like, which is placed on the top of a pallet or skid 40. Dividers 42 are used to separate the rolls. An outer wall 44 of cardboard encases the sides of the rows of rolls. A top sheet or cover, not shown, of cardboard is placed over the rolls, and the thusly formed carton is made into an integrated package or a strong, sturdy carton by means of steel strapping.

Referring, now to FIG. 6 of the drawings, the U-clip assembly 20 is schematically shown being fed from a roll, such as the roll 30 shown in FIG. 7, into the magazine 50 of an automatic clinching machine indicated generally by reference numeral 52. Overlapping wires 54—54 to be wrapped by a clip 10 of the assembly 20 are cradled in the forming jaw 56 of the machine. When the reciprocatable plunger 58 of the machine is actuated, the lead clip of the assembly is separated from the assembly by severing the clip spanning portions 26 of the wires 22—22 between the first clip and the next clip in line. The severed clip is then driven into engagement with the forming jaw 56 where it is reformed or deformed on the overlapping wires 54—54. The plunger then instantly returns to its original position in readiness for the next clip of the assembly. As each clip is successively severed from the assembly 20, the arcuate shape of the plunger 58 acts to position the severed ends 26a of the spanning portions 26 against the crown of the clip while at the same time tapering the severed ends in a manner to eliminate any sharp or abrasive edges. The smooth, even contour of the crown of the clips is thereby preserved, and no sharp edges are present. The construction of the clip assembly of the present invention permits the clips to be sequentially advanced at a high speed in the direction of the forming jaw of the machine by exerting a pulling force on the assembly. In FIG. 6, this pulling force is supplied by a pawl 60. The ability of the assembly to maintain its structural integrity while being subjected to such a force enables the assembly to be fed at high speed into the clinching machine from a roll such as roll 30 comprising, as stated, thousands of clips thereby enhancing the efficiency and the productivity of the operation.

As best shown in FIG. 1 of the drawings, clips 10 from a U-shaped clip assembly 20 of this invention are shown in their reformed or wrapped condition on overlapping wires of a zig-zag spring 70 bordering retaining wires 72. The portions of the wire members 22—22 which remain on the clips after severing lie flat against the crown of the clips as do the severed tapered ends 26a of the spanning portions 26. Thus any sharp, abrasive or cutting edges are eliminated, and the assembled spring can be handled without danger of injury to an operator, and, further, when the article of furniture or bed spring is upholstered, the possibility of any tearing or cutting of the fabric is essentially nil.

While, for purposes of illustration, preferred embodiments of the present invention have been disclosed, other embodiments thereof may become apparent to those skilled in the art, and accordingly, this invention is to be limited only by the scope of the appended claims.

What is claimed is:

1. A clip assembly for use with a clinching tool capable at high speeds of sequentially severing and wrapping a clip on overlying wire members employed in the manufacture of furniture, bed springs, and the like, to secure the members together, comprising: a plurality of generally U-shaped sheet metal clips having an arcuate crown portion and depending leg portions integrally joined in spaced relation to one another to the transverse margins of the crown portion, the clips being arranged in abutting, or near abutting, aligned relation to one another with the transverse axis of the crown portions substantially normal to the longitudinal axis of the clip assembly; and a pair of metal wires for maintaining the clips in positive, fixed abutting, or near abutting, aligned relation to one another, said pair of metal wires being positioned in spaced relation to one another and being secured in point contact with and substantially tangential to the crown portion of each of the clips of the assembly by a metal-to-metal bond in a manner both to prevent the disruption of the positive, fixed, aligned relation of the clips when the clips are subjected to a pulling or tension force and to provide severable clip spanning portions which freely extend between the metal-to-metal bond formed by said pair of metal wires with the crown portion of each clip to enable each clip to be sequentially severed and wrapped by a clinching tool on overlying wire members of a workpiece.

2. A clip assembly according to claim 1 wherein the diameter of the wires is such that when the clip spanning portions thereof are severed by a clinching machine, the profile of the severed wires on the crown portion of each clip is minimal and will be essentially free from any surfaces or edges which may cause injury during handling or which may damage finishing materials coming into contact therewith.

3. A clip assembly for use with a clinching tool capable at high speeds of sequentially severing and wrapping a clip on overlying wire members employed in the manufacture of furniture, bed springs, and the like, to secure the members together, comprising: a plurality of generally U-shaped sheet metal clips having an arcuate crown portion and depending leg portions integrally joined in spaced relation to one another to the transverse margins of the crown portion, the clips being arranged in abutting, or near abutting, aligned relation to one another with the transverse axis of the crown portions substantially normal to the longitudinal axis of the clip assembly; and metal carrier means for maintaining the clips in positive, fixed abutting, or near abutting, aligned relation to one another, said metal carrier means comprising wire secured in point contact with and substantially tangential to the crown portion of each clip by a metal-to-metal bond in a manner both to prevent the disruption of the positive, fixed, aligned relation of the clips when the clips are subjected to a pulling or tension force and to provide severable clip spanning portions which freely extend between the metal-to-metal bond formed by the metal carrier means with the crown portion of each clip to enable each clip to be sequentially severed and wrapped by a clinching tool on overlying wire members of a workpiece, said clip spanning portions serving to impart a flexiblity to the clip assembly which enables the assembly to be wound, under tension, into a tight, self-sustaining, compact, spool-like roll comprising at least several thousand interconnected clips, and being capable when severed by a clinching tool of lying in flush contact with the crown portion of their associated clip.

4. A clip assembly according to claim 3 wherein the assembly, when formed into a self-sustaining spool-like roll, is oriented to position the leg portions of the clips in a direction facing away from the axis of the roll, and the crown portion of each clip of the assembly is oriented to position it in overlying relation to the leg portions of the clips comprising the preceding convolution of the clip assembly on the roll, the ends of the leg portions cooperating with said metal carrier means to restrict lateral movement of adjacent convolutions of the clip assembly with relation to one another whereby the tight, self-sustaining character of the spool-like roll is maintained.

5. In a method for sequentially severing and wrapping a clip on overlying wire members employed in the manufacture of furniture, bed springs, and the like, the clip having a generally U-shape and comprising an arcuate crown portion and depending leg portions: the steps including providing a clip assembly formed of a plurality of said clips, said clips being assembled in positive, fixed abutting, or near abutting, relation to one another with the transverse axis of the crown portion of each clip normal to the longitudinal axis of the clip assembly, the clips being secured in said positive, fixed relation to one another by longitudinally extending flexible metal wire carrier means fused in fixed point contact with and substantially tangential to the crest of the crown portion of each clip of the assembly; forming the assembly, under tension, into a tight, self-sustaining spool-like roll, the clips being oriented on the roll such that the legs of the clips extend radially outwardly with relation to the axis of the roll; mounting the roll formed from the clip assembly for rotation about a horizontal axis; applying a pulling force to the end of the clip assembly on the roll whereby the assembly is pull-fed into a clinching tool capable of sequentially severing and wrapping the clips of the assembly on overlying wire members to be used in the manufacture of an article of furniture, a bed spring, and the like, and sequentially severing and wrapping each clip of the clip assembly on said overlying wire members.

* * * * *